April 4, 1950            G. KEINATH            2,503,052

ELECTRICAL CONTROL AND RECORDING APPARATUS

Filed May 31, 1944            5 Sheets-Sheet 1

INVENTOR.
George Keinath

April 4, 1950  G. KEINATH  2,503,052
ELECTRICAL CONTROL AND RECORDING APPARATUS
Filed May 31, 1944  5 Sheets-Sheet 3

Fig. 5.

INVENTOR.
George Keinath.
BY

Patented Apr. 4, 1950

2,503,052

UNITED STATES PATENT OFFICE 2,503,052

ELECTRICAL CONTROL AND RECORDING APPARATUS

George Keinath, Larchmont, N. Y.

Application May 31, 1944, Serial No. 538,187

23 Claims. (Cl. 318—18)

My invention relates to control and recording apparatus and, in one of its main aspects, especially to apparatus for controlling a condition in accordance with a predetermined program.

In known program controllers, a cam cooperates with a follower and, by moving relative thereto, causes the follower to change its position in accordance with the cam curve, thereby controlling a regulating device to vary an electric current, a temperature, pressure, speed or other condition. In this manner, for instance, the temperature of a furnace or cooling chamber for annealing optical glass or alloys may be controlled as required for a prescribed treating method and through the period of time necessary therefor. Apparatus of similar type may be employed for cutting work pieces in accordance with a given pattern to be traced by the follower, or for a great variety of other purposes in which a controllable condition is to be regulated or changed in a predetermined manner.

It is also known to equip program controllers with indicating or recording devices which measure and record the magnitude of the condition to be controlled in order to permit a supervision of the control operation. An attendant is usually necessary for correcting the regulating operation in order to eliminate excessive discrepancies between program and actual condition.

One of the objects of my invention is to improve control apparatus for purposes of the kind mentioned so as to facilitate adjusting it to different control programs and to avoid the difficulties and mechanical deficiencies often caused by the cam, stencil or mechanical pattern heretofore used in such apparatus.

Another object of my invention is to provide a control apparatus which indicates or records a measured magnitude of the controlled condition in such a correlation to the program curve as to afford at any time an immediate comparison between the intended magnitude and the actual magnitude of the condition.

A further object of my invention is to devise control apparatus, to operate according to a preselected datum value or program, that acts automatically to reduce departures of the measured condition from the program so as to obviate supervision by attendants or to reduce such supervision considerably below what is necessary with known program controllers.

Still another object of my invention is to devise a program controller, preferably of the recording type, that is capable of controlling a plurality of apparatus according to any desired operating program of each individual apparatus or condition to be controlled.

In order to achieve these objects, my invention in one of its aspects, involves providing a chart with a written curve or the like marking representative of the programmatic course to be followed by the condition to be controlled, and recording on the same chart a curve or other marking in accordance with a measured magnitude of the controlled condition so that the pre-set program curve and the recorded measuring curve appear in comparative correlation on the chart.

In another aspect of my invention, I provide control means which regulate the controlled condition in dependence upon the direction and magnitude of a departure of the measured condition from the datum or program condition in order to effect an automatic correction of such departure.

According to one of the essential features of my invention, I provide cyclically operating means which produced two impulses or control effects during each cycle whose phase position relative to the cycle is indicative of the intended and measured magnitudes respectively of the controlled condition so that any departure of one magnitude from the other is represented by a corresponding phase sequence and phase displacement or interval of the two impulses, and the aforementioned correction is produced in dependence upon this sequence, phase displacement, or interval.

In another aspect of my invention, akin to the above-mentioned objects, it is aimed at providing means for indicating or recording errors for supervising, testing or calibrating purposes. The means for achieving this aim as well as other objects and features of the invention will be apparent from the following description of the embodiments shown in the drawings in which:

Figures 1, 3, 4:
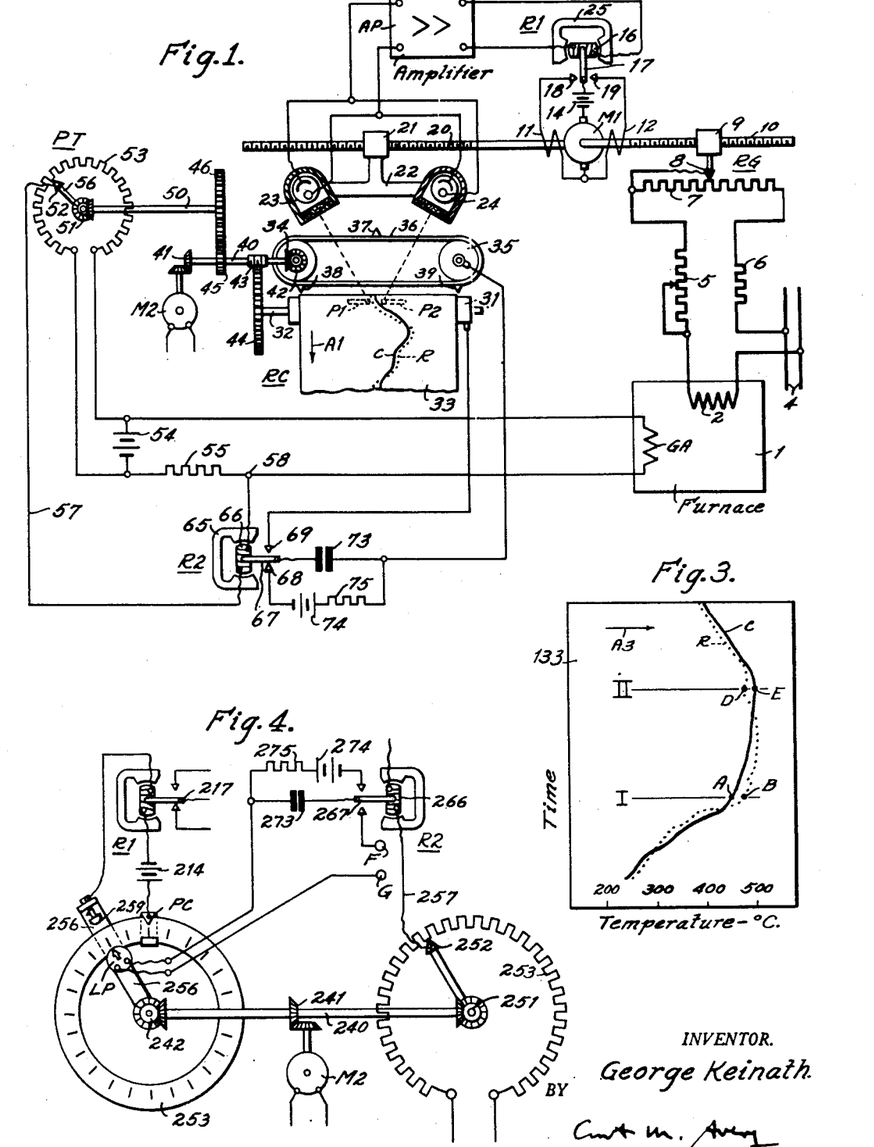
Figure 1 shows the circuit diagram of a control system for a furnace equipped with a recording control apparatus according to the invention.
Fig. 3 is explanatory and represents a recording chart as used in a recording controller according to Fig. 2.
Fig. 4 refers to a third modification and represents essentially the mechanical parts of a circular-scale indicating and control device in conjunction with a portion of the appertaining electric circuit means.

Referring to the apparatus illustrated in Fig. 1, numeral 1 represents an electric furnace as representative of apparatus or structure whose operating condition is to be controlled. The furnace is provided with heating devices such as the heating resistor denoted by 2 and contains a thermoelectric measuring gauge GA, here represented by a resistance thermometer, for measuring the furnace temperature produced by the heater. The heater 2 is energized from a current source 4 through a control rheostat 5, a calibrating resistor 6, and a resistor 7 which forms part of a regulator RG and is provided with a slide contact 8. The current flowing through the heater 2 can be varied by displacing the slide 8 along the resistor 7, and any change in temperature thus effected is sensed by the gauge GA.

Before describing further details of the system, it may be mentioned that it is usually preferable to interpose an amplifying, servomotoric or the like control system between the regulator RG and the furnace or other apparatus to be controlled so that the regulator does not vary the load current directly but furnishes only a control stimulus for the main control system. However, since such furnace control systems or motor control systems are well known in a very large number of varieties and since, as such, they do not represent an essential part of my invention proper, I have chosen to illustrate a directly operating furnace regulator for the sake of simplicity and facility of understanding.

Reverting to the details of Fig. 1, slider 8 of regulator RG is mounted on a holder 9 which is in threaded engagement with a feed screw 10 driven by a motor M1. This motor has two field windings 11 and 12 and turns the screw in one or the other direction depending upon which of the two field windings is energized, thereby displacing the holder 9 and slider 8 correspondingly. Field windings 11 and 12 are connected to a direct current source 14 and to the stationary contacts 18 and 19 of a relay R1. This relay is shown as being of the moving coil type. Its moving coil 16 controls a contact 17 which assumes a midposition between stationary contacts 18 and 19 when the coil 16 is deenergized and engages either contact 18 or contact 19 when the coil 16 is energized depending upon the polarity of energization. The field magnet of relay R1 is denoted by 25.

Relay coil 16 is attached to the output terminals of an amplifier AP whose input terminals are connected to a photoelectric pick up device which forms part of a recording control apparatus denoted as a whole by RC. The pick up device has a holder 21 in threaded engagement with a feed screw 20 which is driven by the motor M1 in synchronism with feed screw 10. The holder 21 carries a base 22 for two photoelectric pick ups 23 and 24.

The recording control apparatus RC is provided with a drum electrode 31 mounted on a shaft 32. This drum electrode accommodates a recording chart consisting of a paper strip 33, for instance, of the electro-responsive type such as known under the trade name Teledeltos paper. A stylus assembly is provided for producing recording marks on the chart 33. This assembly, as exemplified in Fig. 1, has two sprocket wheels 34 and 35 surrounded by a sprocket chain or belt 36 which carries three stylus electrodes 37, 38 and 39 equally spaced from each other by approximately the width of the recording chart. A drive motor M2, operating for instance at constant speed, drives a shaft 40 through a gear 41. Wheel 34 of the stylus assembly is driven by shaft 40 through a gear 42 so that the three stylus electrodes travel sequentially over the chart 33 in a given direction. Immediately after one stylus has left the chart the next stylus enters into the operative portion of its travel. However, the traveling motion is idle, that is, no recording mark is produced on the chart 33, unless voltage is applied across the chart between the adjacent stylus and the drum electrode 31. In order to permit such an electric energization, the stylus electrodes are conductively connected, for instance through the chain or belt 36, with wheel 35 which in turn is electrically connected with a relay-controlled discharge circuit to be described in a later place. Similarly, the drum 31 is connected with the other pole of the same discharge circuit.

The shaft 40 carries a gear 45 which meshes with a gear 46 for driving a shaft 50 which in turn causes a gear 51 to rotate the arm 56 of a potentiometric circuit member here represented by an ohmic voltage divider or potentiometer rheostat PT. Arm 56 carries a slide contact 52 which engages the potentiometer resistor 53. This resistor has its two terminals connected with the two terminals of the measuring gauge GA, respectively, a reference impedance 55 being interposed in one of these connections. A current source 54 is connected across the terminals of resistor 53. The slider 52 of potentiometer PT is connected by a lead 57, through the coil 66 of another relay R2, with a point 58 of the potentiometer circuit located between impedance 55 and gauge GA. Relay R2 is shown as being of the moving coil type, its field magnet is denoted by 65. The movable contact 67, controlled by the coil 66, is normally in engagement with a stationary contact 68 and capable of switching over to a stationary contact 69.

The circuit connecting the gauge GA with the potentiometer PT and the relay R2 will be recognized as a balanceable Wheatstone bridge network. The current source 54 lies in the supply diagonal of the network, while the relay R2 is located in the zero branch. When the drive motor M2 is in operation, the slider 52 rotates unidirectionally for instance in the clockwise direction. When it starts a cycle of operation at one terminal of resistor 53, the bridge network is unbalanced so that a current is passed through the zero branch 57 thereby energizing coil 66 of relay R2 in such a manner that contact 67 is in engagement with contact 68. In this stage of operation, a capacitor 73, connected with movable contact 67, is charged from a current source 74 through a resistor 75. During its cycle of continuing motion, the slider 52 of potentiometer PT passes through a point of instantaneous adjustment in which the bridge network is balanced so that the voltage across the zero branch passes through zero and assumes opposite polarity. In this moment, the relay R2 is caused to switch its movable contact 67 instantly over to the stationary contact 69. As a result the capacitor 73 is connected across the gap between the drum electrode 31 and the one stylus which is then in its operative range of travel. The discharge, passing between the stylus and drum, produces a dot or the like recording mark on the chart paper. This discharge is self-terminating, that is, it exhausts itself so quicky, relative to the traveling speed of stylus assembly and potentiometer slider, that the recorded marking is representative of the balance position of slider 52 and hence of the magnitude of the condition measured in that moment by the gauge GA. During a series of operating cycles, a sequence of recording marks is produced on the chart 33 and this sequence forms a curve R representing the change of the condition to be measured versus time.

The chart 33 is provided with a program curve C, for instance, of red color. This curve is marked on the chart before the recording controller is set in operation and represents a desired course of operation to be followed by the controlled condition during a given period of time. For instance, the program curve C may represent the changes in temperature desired in an industrial furnace during 24 hours as required for an intended fabricating procedure such as for heating or slow cooling optical glass, or for metallurgical heat treatments and the like processes.

The above-described photoelectric pick ups 23 and 24 are chromatic, that is, they are provided with light filters so that they respond to the color of the program curve C but remain non-responsive to the color of the record R. The two photoelectric pick ups are focused on the areas P1 and P2 respectively which lie close together on the surface of the chart 33. The connections of the pick ups with the amplifier AP are of opposite polarities relative to each other. Consequently when the focal area P1 of pick up 23 coincides with the red program curve C an impulse is transmitted to relay R1 which causes it to move its contact 17 into engagement with contact 18, while the pick up 24 when its focal area P2 meets the program curve C produces an impulse of opposite polarity thereby causing an engagement between contacts 17 and 19. Consequently the motor M1 will displace the slider 8 of regulator RG as well as the pick up assembly in one or the other direction depending upon which of the pick ups 23 or 24 is effective.

The operation of the above-described system as a whole is as follows: Let us assume that the furnace is in operation at the desired temperature while the motor M2 is in operation and rotates the slider 52 of potentiometer PT clockwise and advances the chart 33 in the direction of the arrow A1 in proportion to time. As long as the temperature of the furnace measured by gauge GA is in accordance with the program represented by curve C, i. e. as long as any departure of the furnace temperature from the datum value remains within given limits, neither of the focal areas P1 and P2 will coincide with curve C, so that the two pick ups 23 and 24 are inactive, and the movable contact 17 of relay R1 is in its inoperative mid-position. As a result, the motor M1 is deenergized and maintains the regulator RG and the pick up assembly at rest. When now, during its continuing travel along the direction A1, the curve C signals a reduced temperature, it will move into the focal path of pick up 23 and cause it to generate a voltage. The corresponding amplified voltage imposed on relay R1 causes it to energize motor winding 11. Motor M1 starts running in the direction which corresponds to a movement of the pick up assembly towards the left, thereby adjusting the regulator RG toward lower furnace temperatures. The movement of the pick ups has the effect of disengaging the focal path of pick up 23 from program curve C so that the pick up 23 is eventually deenergized, the relay contact 17 returned into neutral position and the motor M1 stopped.

Similarly, if the advancing program curve C signals an increase in temperature, it will enter into the focal path of pick up 24. This causes relay R1 to energize motor M1 for rotation in the opposite direction, thereby adjusting the regulator RG for an increase in furnace temperature while at the same time disengaging the focal path of pick up 24 from program curve C.

As apparent from the foregoing, the record curve R representing the measured temperature is produced on chart 33 in juxtaposition to the preselected program. Consequently it is easy to recognize at a glance whether the measured temperature is in accordance with the intended program of operation. Due to certain limitations and difficulties involved in systems of this type, it cannot be expected, as a rule, that the measured temperature is always sufficiently close to the program temperature. It may therefore be necessary that an attendant observe the record in comparison with the program curve and adjust the rheostat 5 in order to correct discrepancies.

My invention, however, provides also means for eliminating the necessity of such manual correction by rendering the control apparatus self-correcting. Such an operation is achieved in embodiments according to Figs. 2 through 7.

In order to facilitate comparing Figs. 2 through 7 with Figure 1 and with one another and also in the interest of brevity and clarity of description, the last two digits of the reference numerals used in all figures are identical wherever these numerals refer to functionally comparable elements.

Figure 2:
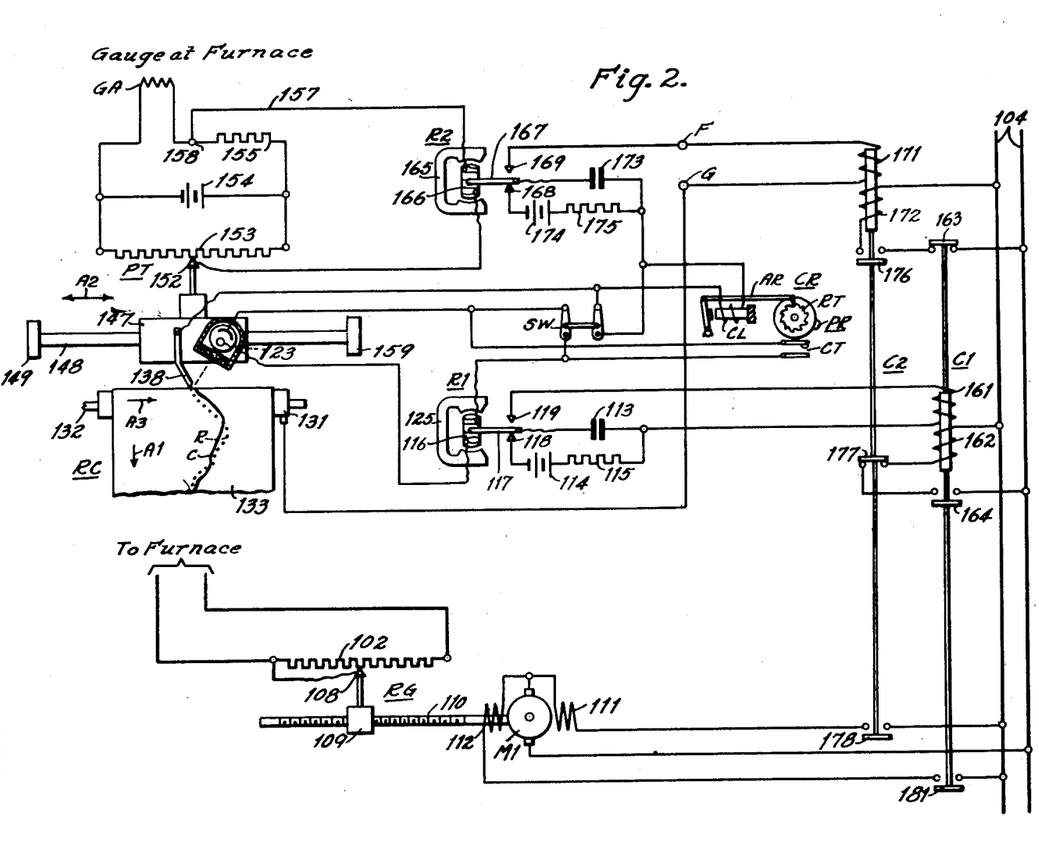
Fig. 2 shows another embodiment of a recording controller designed for automatic operation of higher accuracy than usually obtainable with apparatus according to Fig. 1.

Referring to Figure 2, the regulator for varying the condition to be controlled is denoted by RG and contains a potentiometer resistor 102 whose slider 108 is mounted on a holder 109 in threaded engagement with a screw 110 driven by a reversible motor M1. The two field windings 111 and 112 of motor M1 are energized from a direct current source 104 under control by contacts 161 and 178 of two control contactors C1 and C2, respectively. Contactor C1 has two control coils 161 and 162 and is provided with an interlock contact 163 and a self-sealing contact 164 in addition to the above-mentioned main control contact 181. Similarly the contactor C2 is equipped with two coils 171 and 172 and has a self-sealing contact 176 and an interlock contact 177 in addition to the main control contact 178.

The coil 161 of contactor C1 is rated for temporary excitation by a discharge circuit, which includes a capacitor 113, a current source 114 and a resistor 115, under control by the moving coil 116 of a relay R1 which has a movable contact 117 and two stationary contacts 118 and 119. The field magnet of relay R1 is denoted by 125.

Coil 116 of relay R1 is controlled by a photoelectric tube 123, an amplifier (not illustrated) being preferably interposed between the tube and the relay. The tube 123 forms the pick up of a recording controller RC. This controller has a drum 131 whose shaft 132 is driven at constant speed and accommodates a recording chart 133 which during the operation of the apparatus travels in the direction indicated by the arrow A1. The chart is provided with a program curve C for controlling the regulator RG and the condition affected thereby in accordance with a predetermined course of operation. The chart 133 serves also as a recording surface for a stylus 138 which is mounted together with the photoelectric tube 123 on a carrier 147. The carrier is guided by a bar 148 for reciprocal motion along the width of the recording chart 133 as is indicated by the double-headed arrow A2. The motor, gearing or other transmission means (not illustrated in Fig. 2) for imparting reciprocal motion to the carrier 147 may be of any suitable type. The stylus 138 and drum 131 are connected to a discharge circuit which comprises a capacitor 173, a current source 174 and a resistor 175. This circuit is under control by a relay R2. Moving coil 166 of relay R2 causes a contact 167 to either engage a stationary contact 168 for charging the capacitor 173 or to engage a second stationary contact 169 for discharging the capacitor 173 through the stylus chart and drum and through the above-mentioned control coil 171 of contactor C2 which is series connected to the stylus and drum electrodes of the recording controller RC.

The relay R2 is connected in the zero diagonal of a balanceable measuring network of the Wheatstone bridge type. This network includes the gauge GA for measuring the magnitude of the condition controlled by the regulator RG. The bridge network is energized by a current source 154 and contains a reference impedance member 155 and an adjusting or balancing device consisting of a potentiometer PT whose resistor 153 cooperates with a slide contact 152. The slide contact is mounted on the carrier 147 of the stylus and photoelectric pick up assembly of the recording controller RC.

A control relay CR of the step switch type is provided for an auxiliary purpose to be mentioned in a later place. A switch SW is provided in the discharge circuits controlled by the relays R1 and R2 and, when placed in the illustrated condition, short circuits the auxiliary relay CR, thereby rendering it ineffective.

The apparatus according to Fig. 2 operates in the following manner. The stylus and pick up assembly begins its cycle of operation at the left-hand end of the recording chart 133 and is in operation, as regards its electrical function, only when its direction of travel corresponds to that denoted by the arrow A3. That is, upon completion of its forward movement the electric connections of stylus and tube are interrupted so that the return travel, in opposition to the arrow A3, produces no active effect on the control relays R1 and R2, thereby permitting them to maintain the correlated coils 161 and 171 of contactors C1 and C2 disconnected while charging the respective capacitors 113 and 173 in order to place them in readiness for the next control operation. In order to effect such an inoperative return travel, end or limit switches, such as denoted schematically by 149 and 159, may be arranged at the end points of the reciprocating travel of the stylus and pick up assembly. Details of such limit switches are not illustrated because devices of this type are well known, and also because an inoperative return motion of the recording and control assembly can be avoided for instance by employing a unidirectional motion as obtained in devices of the type shown in Figs. 1, 4 and 5.

When the stylus and pick up assembly during its operative motion passes through a point where the adjustment of the slider 152 is in accordance with the balance condition of the measuring network, the relay R2 switches into its discharge position and causes the capacitor to pass an instantaneous and self-terminating current through the recording chart 133 thereby producing a recording mark on the chart. A series of such marks forms a curve R representative of the condition measured by gauge GA versus time. The recording discharge passes also through coil 171 and causes contactor C2 to actuate its contacts. The closure of contact 176 establishes a self-holding circuit for coil 172. Consequently, the contactor C2 stays in after the termination of the capacitive discharge current. The opening of relay contact 177 renders the self-holding coil 162 of contactor C1 inoperative. The closure of contact 178 energizes motor M1 so as to displace the slider 108 of regulator RG.

When the point of incidence of tube 123 on chart 133, during the assembly motion in the direction of arrow A3, intersects the program curve C, the tube 123, which as in the embodiment of Fig. 1 is provided with a monochromatic lens or filter, issues a voltage impulse which causes the relay R1 to switch its contact 117 from stationary contact 118 to contact 119 thereby discharging the capacitor 113 through coil 161 of contactor C1.

It should be understood, however, that a non-chromatic pick up can also be used if its pick up point is located slightly ahead of the stylus point so that the pick up is not affected by the recorded measuring curve, or if the program curve C is heavy compared with the recorded curve R so that the pick up does not respond to the recorded curve. An amplifier (not shown) is preferably arranged between tube 123 and relay R1. The energization of coil 161 has the effect of closing contact 181, thereby energizing the motor M1 so as to displace the slider 108 in the direction opposite to that produced by the operation of contactor C2. Together with the closure of contact 181, contactor C1 completes a contact 164 a self-holding circuit for its coil 162, provided contact 177 of contactor C2 is closed. Simultaneously, the interlock contact 163 in the self-holding circuit of contactor C2 is opened.

When the condition measured by gauge GA is not sufficiently in accordance with that prescribed by the program curve C, the recorded curve R will depart from the program by extending either towards the left or towards the right of curve C at any instant under consideration. Assuming that in a given moment the measured magnitude of the condition to be controlled is below the datum value set by the program curve, the impulse issued by relay R2 of the measuring device will occur earlier than the control impulse produced by the passage of the focal path of tube 123 across the program curve C. The first impulse which causes the stylus 138 to produce a recording mark on chart 133 effects also the closure of contact 178 in contactor C2 so that the motor M1 is caused to correct the adjustment of regulator RG in the direction necessary for reducing the discrepancy between the datum value and the measured value. The contactor C2 seals itself in so that the motor M1 is capable of continuing its operation after the termination of the capacitive impulse. However, as soon as the focal path of tube 123 meets the program curve C, the impulse produced by the appertaining relay R1 energizes the coil 161 of contactor C1. This contactor opens the interlock contact 163 and thus disconnects the holding coil 172 of contactor C2 from its current source. As a result, the motor M1 is stopped and it may receive a temporary braking kick in the opposite direction due to the closure of contact 181. However this closure is transient because the contactor C2, when closing its self-sealing contact 164, does not complete a holding circuit for its coil 162 because the contact 171 is still open at this time. In summary, the motor M1, having constant speed, is caused to shift the slider 108 of regulator RG through a path of deflection which is proportional to the phase difference or interval of time between the occurrence of the measuring and program impulses and this measure is proportional to the distance between program curve C and recorded curve R in the coordinate direction of the chart denoted by A3.

When the measured magnitude of the condition to be controlled is higher than that dictated by the program curve C, the program impulse produced by the photoelectric tube 123 occurs earlier than the measuring impulse produced by the measuring device. Consequently relay R1 will now discharge its capacitor earlier than relay R2. The first discharge passes through coil 161 of contactor C1 and closes contact 181 thereby starting motor M1 for operation in the direction necessary for reducing the magnitude of the condition controlled by regulator RG. Simultaneously, the self-sealing contact 164 is closed and, since at this moment the contactor C2 is deenergized and its contact 171 closed, the holding coil 162 of contactor C1 is energized and maintains the contactor in its operative condition. The second impulse produced by relay R2 passes through the stylus in order to produce a recording mark and also traverses coil 171 of contactor C2. Contact 171 opens the holding circuit of contactor C1 so that motor M1 is stopped. Both contactors return immediately into their initial, inoperative position because contactor C2 cannot seal itself in since contact 163 is open when contactor 176 tends to close the circuit. Hence, motor M1 is again operated for an interval of time which corresponds to the interval between the occurrence of the two impulses and produces a displacement in the regulator RG which is indicative of this interval and of a direction opposite to that mentioned previously in order to again introduce a correction towards minimum or zero discrepancy between curves C and R. In other words, the direction of regulating adjustment is determined by the phase sequence of the two impulses while the magnitude of adjustment is in accordance with their phase difference.

This operation is further elucidated by the recording chart illustrated in Figure 3. At the instant denoted by I, with the stylus and pick up assembly traveling in the direction of arrow A3, the pick up reacts first at the point of curve C denoted by A and starts the regulator motor M1 in the direction of decreasing temperature. At point B on curve R the stylus discharge causes the motor to stop. At the time denoted by II the assembly traveling in the direction of arrow A3 causes the motor to start running in the temperature raising direction when the stylus meets point D, and the motor is stopped when the focal path of the photoelectric tubes meets point E.

The recording periods of the apparatus may be short or long according to the requirements of the particular control operation. For instance, periods of one or several seconds up to several minutes may be chosen. It is often desirable, however, to measure and record the control magnitude more often than to vary the adjustment of the regulator. For instance, when a recording period of two to five seconds is chosen, it may be unnecessary or undesirable to actuate the regulator more often than, say, each tenth or twentieth recording period, for instance, every fifty or one hundred seconds when the recording period is five seconds. The above-mentioned control relay CR (Fig. 2) serves to accomplish such method of operation. When the switch SW is opened the coil CL of relay CR is connected in the discharge circuit controlled by relay R2 and hence receives one impulse for each individual operation of the recording elements. Coil CL controls an armature AR which acts on a ratchet RT and rotates a projection PR once for a given number of impulses. A contact CT is so arranged, relative to the path of projection PR, that it is closed once for each rotation of the ratchet. Consequently, the contact CT remains open during, say, nine periods of recording operation and stays closed only in the following tenth recording period. The contact CT, with switch SW open, is connected in the energizing circuit of relay R1 and hence prepares it for operation every tenth measuring and recording period.

It will be understood that the time constants of the relays, contactors and discharge circuits have to be chosen relative to one another so as to secure the above-described operation. In view of the fact that the discharge period of the capacitive control circuits is very short as compared with the operating period of the recording controller and of the contactors C1 and C2, such adjustment does not involve undue difficulties. It is further apparent that wherever necessary amplifiers can be inserted between controlling and controlled elements of the system, for instance, between relays R1 and R2 and coils 161 and 171 of contactors C1 and C2, respectively. Further possible modifications will be apparent from the embodiments described hereinafter.

The invention is not limited to pick up devices of the photoelectric type and it may also be applied to exhibiting devices other than of the recording type. Thus, in the embodiment according to Figure 4 the exhibiting device consists of a circular-scale instrument. The scale 253 is calibrated in magnitudes of the condition to be measured. The pointer consists of a rotatable arm 256 which carries at its free end a neon tube or flash lamp LP. As shown, the lamp may be covered with an opaque material so that the illuminated area represents a point or arrowhead. The arm 256, when in operation, is rotated by a gear 242 driven by a shaft 240 which drives also the slider 252 of a circular resistor 253. The driving energy is supplied by a motor M2 through a gear 241. The resistor 253 forms part of a measuring network, for instance, of the type shown in Figure 2. The zero diagonal 257 of this network includes the moving coil 266 of a relay R2 whose movable contact 267 controls a capacitive discharge circuit containing a capacitor 273, a current source 274 and a resistor 275. The terminals marked F and G in Fig. 4 correspond to the equally designated points F and G in Figure 2 and may be connected to a control contactor corresponding to contactor C2 in Figure 2. The discharge circuit includes the lamp LP. Consequently when the angular position of slider 252 is indicative of the magnitude measured by the gauge GA, the relay R2 switches over and produces a light flash in lamp LP. Since the lamp rotates in synchronism with slider 252 and in a fixed angular relation thereto, its position at the flashing moment is also representative of the measured magnitude. Hence the flash indicates the magnitude on the scale 253. If the instrument is operated at a sufficient speed, for instance, ten or more rotations per second, a seemingly continuous indication is effected.

The circular scale member 253 is provided with an angularly displaceable contact PC which can be set relative to the scale graduation so as to indicate a datum value to be kept constant by the control apparatus. A brush contact 259 resiliently mounted on arm 256 engages the contact PC once during each rotation of the arm. Each contact engagement causes energization of a relay RI from a current source 214 so that the movable relay contact 217 is actuated. Relay RI may be connected to a contactor, for instance, like contactor CI in Figure 1, so that the two relays and the impulses transmitted thereby control the operation of a regulator in a direction depending upon which impulse comes first and by an amount determined by the phase difference or time interval between the occurrence of contact engagement between PC and 259 and the occurrence of the measuring impulse and light flash. The datum value to be maintained constant can be changed at will by displacing the contact PC.

Figure 5:
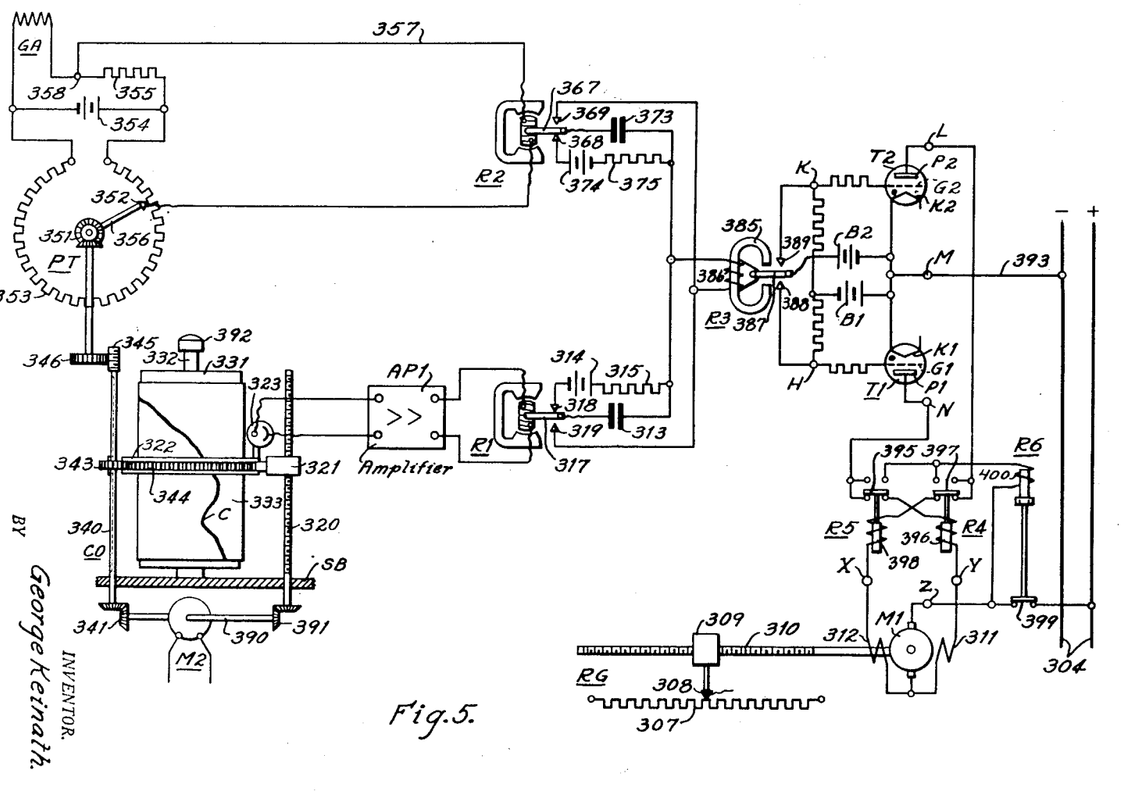
Fig. 5 is a diagram of a fourth embodiment showing a control apparatus in conjunction with partly electromagnetic and partly electronic relay means for regulation the condition to be controlled.

In the embodiment according to Figure 5, RG denotes the regulator for adjusting the condition to be controlled. GA the gauge for measuring the magnitude of the controlled condition, and CO a control or exhibiting apparatus for controlling the regulator RG in accordance with a predetermined program and in dependence upon the magnitude of the controlled condition as measured by the gauge GA.

The exhibiting apparatus CO is designed in accordance with the principles disclosed in the copending applications Serial No. 531,374, filed April 17, 1944, now Patent 2,401,350, of R. K. Hellmann for Recording apparatus, and Serial No. 531,375, filed April 17, 1944, now Patent 2,401,356, of G. Keinath and R. K. Hellmann for Recorders.

The apparatus CO has a normally stationary drum 331 whose shaft 332 carries a knob 392 which permits turning the drum and the chart 333 mounted thereon into a convenient angular position and serves also for pulling the drum upwardly out of its seat in order to permit exchanging the chart. When in proper position, the drum is attached to a supporting structure SB which has at least one feed screw 320 and a shaft 340 both extending along the drum in parallel to the drum axis. Feed screw 320 and shaft 340, when in operation, are driven, preferably in proportion to time, by a motor M2 through a shaft 390 and two gears 391 and 341, respectively. A support 321 is in threaded engagement with feed screw 320 so that it is slowly displaced along the drum by the revolution of the screw. An annular member 322 surrounds the drum 331 and is supported by the support 321 so as to follow the displacing motion of the latter while being capable of rotary motion about the drum. The annular member 322 has a coaxial gear portion 344 in meshing engagement with a pinion 343 which is keyed to shaft 340 and revolves together with the shaft while sliding along the shaft according to any axial displacement of member 322 on support 321.

The chart 333 is provided with a program curve C before it is mounted on the drum 331. A photoelectric tube 323 is mounted on member 322. When apparatus CO is in operation, the tube 323 rotates about the chart so that its focal path passes once across the curve C during each cycle of rotation. Simultaneously, the tube 323 translates gradually along the drum so that the entire chart surface is scanned during a given period of time. Each time the pick up path crosses the program curve, an impulse is issued by the tube 323 and causes an amplifier API to switch the movable contact 317 of a relay RI from one stationary contact 318 to another stationary contact 319. A capacitor 313, previously charged from a current source 314 through a current limiting resistor 315 and through contact 318, is then connected to the coil 386 of a polarized relay R3. The polarity of the capacitive discharge is such that it causes the polarized member 387 of relay R3 to move toward the lower pole of the field structure 385 thus establishing a temporary engagement with a stationary contact 388 before it returns into its neutral position between contacts 388 and 389.

The gauge GA is connected to a measuring apparatus of same type as in the embodiments of Figs. 1 and 2. It forms one branch of a balanceable bridge network whose other branches contain an impedance reference 355 and a voltage divider PT of the ohmic type. The resistor of divider PT is denoted by 353. Its slider 352 is mounted on a rotatable arm 356. This arm is geared to motor M2 by gears 345, 346 and 351 and performs a full rotation for each rotation of member 322 and pick up tube 323. The device PT is preferably mounted on the supporting structure SB of the control apparatus CO so as to form an integral part thereof, for instance, in the manner described and illustrated in detail in the above-mentioned Patents 2,401,350 and 2,401,356.

The zero diagonal 357 of the measuring network, extending between circuit point 358 and slider 352, controls a relay R2. Each time the slider 352 passes through the balance point, the diagonal voltage changes its polarity and causes the relay member 367 to switch from contact 368 to contact 369 thereby discharging a capacitor 373, previously charged from a current source 374 through a resistor 375, across coil 386 of the polarized relay R3. The polarity of this measuring discharge is opposite to that of the control discharge released by relay RI. Consequently, the impulse transmitted by relay R2 causes the polarized relay member 387 to move into temporary engagement with contact 389.

Reviewing the above-described portion of the measuring control system, it will be understood that during each cycle of operation of the control and measuring apparatus two impulses of opposite polarity are issued to relay R3, one occurring when the pick up meets the program curve and the other when the instantaneous adjustment of the measuring circuit is indicative of the magnitude measured by gauge GA. As a result, the relay R3 moves its contact 387 first toward one and then toward the other of contacts 388 and 389 in a sequence that depends on which of the two impulses comes first. The interval of time between the two impulses is a measure of the departure of the measured magnitude from the datum magnitude prescribed by the program curve C.

The devices disposed between relay R3 and regulator RG serve to measure the interval of time between the two impulses occurring within the same cycle of operation and to translate this interval into a corresponding displacement of the regulator. The slider 308 of regulating resistor 307 is mounted on a carrier 309. A screw 310 driven by a reversible motor M1 is engaged by carrier 309 so that the latter is displaced along resistor 307 in accordance with the direction and period of operation of motor M1. The two oppositely acting field windings 311 and 312 of motor M1 are energized from a current source 304 under control by electronic relays T1 and T2, for instance of the gaseous discharge type known as "Thyratron." The motor circuit includes also two interlock relays R4 and R5 and a step relay R6. The thyratrons T1 and T2 have their respective cathodes K1 and K2 connected by a common lead 393 to one pole or main of the current source 304. The anode P1 of thyratron T1 is connected through contact 395 of relay R5 and coil 396 of relay R4 with one terminal of motor winding 311. Correspondingly, anode P2 of thyratron T2 is series-connected through contact 397 of relay R4 and winding 398 of relay R5 with one terminal of motor winding 312. The midpoint of windings 311 and 312 is connected, through the armature of motor M1 to the other pole or main of source 304 in series with the normally closed interrupter contact 399 of a stop relay R6. The control coil 400 of relay R6 lies in a circuit that extends between the motor side of contact 399 and two contacts of relays R4 and R5 respectively. Coil 400 is normally deenergized, and contact 399, under a suitable bias, is closed.

The control grids G1 and G2 of the two thyratrons are each connected through a resistor arrangement with a source B1 of grid voltage in such a manner that the grid potential of both tubes is normally sufficiently negative with respect to the cathode as to block the flow of current through the tube. The points H and K of the two grid circuits are connected with the two stationary contacts 388 and 389 respectively of the polarized relay R3. The movable contact 387 of relay R3 is connected to a voltage source B2 of such rating and polarity that the engagement of movable contact 387 with either contact 388 or 389 imposes a positive potential on the respective grid thereby firing either tube T1 or T2. As a result either field winding 311 or 312 of motor M1 is energized and starts the motor in the corresponding direction of rotation.

Starting from the illustrated condition of rest, and assuming the control and measuring apparatus to be in operation under control conditions which cause the relay R1 to respond earlier than relay R2, the first impulse, caused by the program curve and the photoelectric pick up 323, will kick the member 317 of relay R1 toward contact 319. This starts a current flow from source 304 through thyratron T1 and motor winding 311 so that motor M1 starts displacing the regulator RG. The motor current traverses coil 396 of relay R4 and, at contact 397, disconnects the thyratron T2 from coil 398 of relay R5 and also from motor winding 312, while now connecting coil 400 of stop relay R6 to the anode P2 of thyratron T2. Coil 400 remains deenergized because grid G2 of thyratron T2 maintains its negative blocking potential. When the discharge impulse from capacitor 313 of relay R1 terminates, member 317 returns into its neutral position. This, however, does not affect the current flow through thyratron T1 so that motor M1 continues operating. The second impulse, now issued by relay R2 in response to the occurrence of balance in the measuring network of gauge GA, causes relay R2 to kick its movable member 367 into touch with stationary contact 369. This renders the thyratron T2 conductive. Its plate current passes from contact 397 through coil 400 and causes the stop relay R6 to cut off the current supply to both tubes T1 and T2 so that the motor M1 is stopped and the system reset into the initial condition. The stop relay may have a quick pick up and a delayed drop off so that a sufficient interval of time is available for the thyratrons T1 and T2 and the relays R4 and R5 to become deenergized before contact 399 is reclosed.

When during a control cycle the relay first to respond is the relay R2, the above-described control operation occurs in substantially the same manner, except that now the thyratron T2 becomes conductive first and causes the motor M1 to run in the opposite direction while switching the thyratron T1 over to coil 400 of the stop relay R6.

In this manner, the impulse first to occur starts the motor running and determines the running direction and the subsequent impulse stops the motor and resets the relay system for a subsequent operation.

When both impulses occur simultaneously or very close together, i. e. when the magnitude of the condition to be controlled is sufficiently close to the program magnitude and hence does not require a change in setting of regulator RG, the two impulses will balance and cancel their effects on the relay R3 thus causing no operation of the thyratron-controlled portion of the system.

As described in the foregoing, the control operation is performed without necessarily requiring any indicating or recording means. However, such means may be connected in the measuring circuit of gauge GA, preferably by placing a stylus on the annular member 322 of apparatus CO so that the record is produced on the exhibiting surface member or chart 333 in correlation to the program curve C as described in conjunction with the embodiments of Figs. 1 and 2. Another way of providing such systems with recording means will be referred to in a later place in conjunction with Figs. 8 and 9.

Figure 6:
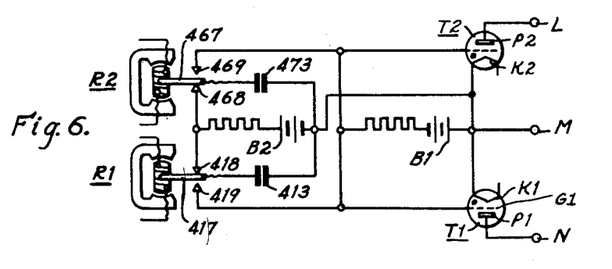
Fig. 6 represents a modified portion of a control apparatus otherwise similar to the one illustrated in Fig. 5.

The modification shown in Fig. 6 concerns the portion of the system of Fig. 5 that extends between the relays R1, R2 and points L, M, N of the thyratron plate circuits. According to Fig. 6, the capacitors 413 and 473 are normally in charging connection with a direct current source B2. When relay R1 responds to a control impulse issuing from the pick up, it switches its movable contact 417 from stationary contact 418 to stationary contact 419 and places a positive potential on the grid of thyratron T1 thus initiating its operation. When relay R2 responds to an impulse from the gauge network it will similarly fire the thyratron T2 by switching contact 467 from contact 468 to contact 469. The interval of time between control and measuring impulses is then translated into a corresponding correction in the adjustment of the regulator RG in substantially the same manner as in the system of Fig. 5.

The possibility of substituting electronic for electro-mechanical relay means, as illustrated by Figs. 2 and 5 for instance, may of course be carried to a further extent For example, the relays R1 and R2 may be replaced by electronic relays. However, since the particular type of relay means is not essential to the present invention proper, a description and illustration of further embodiments of this type appears unnecessary.

Figure 7:
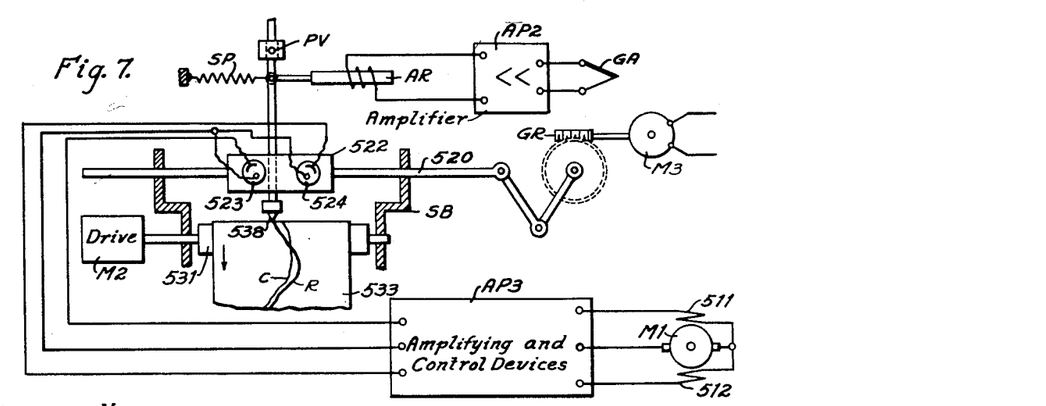
Fig. 7 is a schematic representation of still another form of recording controllers according to the invention.

The recording control apparatus shown in Fig. 7 involves a continuously writing recorder, such as an ink recorder, and has pick up means responsive to the curve written by the recorder.

According to Fig. 7, a strip chart 533, driven by a drum 531 and motor M2, is provided with a predetermined program curve of a given color, say red. An ink stylus 538 has its pendulous holder pivoted at PV and is operated by a return spring SP and the core AR of a solenoid in accordance with the output current of an amplifier AP2 controlled by a measuring gauge GA. Stylus 538 writes a curve R on the same chart 533 in a different color, say blue. A holder 522 mounted on a rod 520 is periodically reciprocated along the drum 531 by means of a crank type drive actuated by a motor M3 through a gear GR. Two photoelectric tubes 523 and 524, mounted on the holder 522, are equipped with optical filters so that tube 523 responds to the blue color of curve R and tube 524 to the red color of curve C, the focal beams being located so that they traverse the curves close to the point of the stylus. The tubes 523 and 524 issue impulses whenever they pass across the respective curves, and these impulses cause an amplifying control device AP3 to operate the motor M1 in one or the other direction by energizing one of its field windings 511 and 512 in substantially the same manner as shown and described in detail in conjunction with the preceding embodiment.

Reviewing the above-described control apparatus of the automatically correcting type represented by Figs. 2 through 7, some preferable ways of designing and operating them will now be mentioned in supplement of the foregoing description.

The reversible motor, such as the one denoted by M1, controlled by the pair of impulses and running during the impulse interval, consists preferably of a low inertia motor for instance of fractional horsepower so that it starts and stops quickly as compared with the duration of the minimum interval at which a corrective action is to take place. If desired, a friction or clutch brake may be employed so that it stops the motor whenever the motor circuit is deenergized. This brake (not illustrated) may be of the spring-set and magnetically released type and its releasing magnet coil may be connected with the motor circuit, for instance in Fig. 6 in series-connection between motor M1 and contact 398.

The extent of rotary travel of motor M1 and the displacement of the regulator RG are, as mentioned, a measure of the interval of time elapsing between the two impulses issuing from the program and measuring apparatus within a cycle of operation. As a matter of fact, in the above-described embodiments each individual running period of motor M1 is substantially coextensive with the impulse interval. It will be understood, however, that the actual regulation or correction of the condition to be controlled need not, and in many cases of application can hardly be completed during the same interval of time. For instance, when the regulator RG controls or corrects a temperature, some additional time will expire before the new temperature is reached. Since a period of time elapses between each two impulses and since the cyclical motion of the measuring circuit means or of the program pick up means can be chosen at will, since further the cycles may follow intermittently or, as described, one control cycle may be obtained only after a multiple of measuring cycles, apparatus of this type are readily applicable for a large variety of regulating functions of widely different time constant.

The impulse controlled regulator (RG) is applicable for controlling various kinds of electrically controllable apparatus and, according to the desiderata of particular purposes, may consist of other types of regulating means than ohmic rheostats.

Another field of application is that of producing an indication or recording of errors for controlling, testing and calibrating purposes. An example of apparatus especially adapted to such purposes is shown in Figs. 8 and 9.

Reverting for a moment to the apparatus according to Figs. 1 through 7, it will be remembered that the interval between two correlated impulses, or the distance between program curve and recorded curve, or each change in adjustment of the regulator RG represents an error, namely the error of the measured magnitude as compared with the intended or program magnitude, and this error can be read off, for instance, by measuring or estimating the distance betwen the program curve and the recorded measuring curve. Hence, it will be understood that apparatus operating on similar principles can also be applied for affording a direct indication or record of the amount of errors. To this end, the apparatus is preferably equipped with an indicating or recording instrument that operates, much like the motor M1 of the above-described regulator RG, in dependence upon the sequence and phase interval of the two correlated impulses. Such an instrument can either be used in addition to any complete system described above, or it may take the place of the regulator RG and its motor M1, or substitute the above-described means for recording the gauge-measured magnitude. This will be elucidated presently with reference to Figs. 5, 8 and 9.

Figure 8:
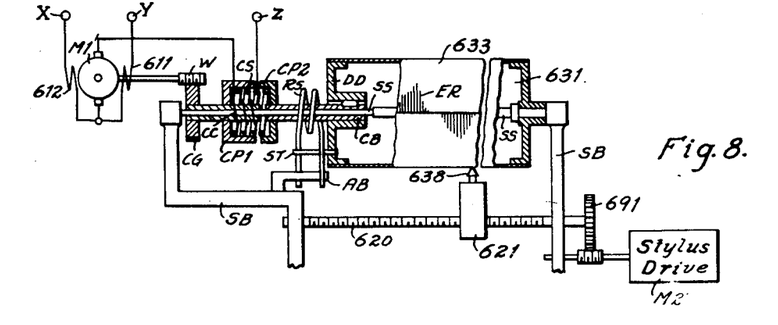
Fig. 8 exemplifies an instrument for recording, regulating or indicating errors which is applicable in conjunction with control means according to Figs. 5 or 6.
Figure 9:
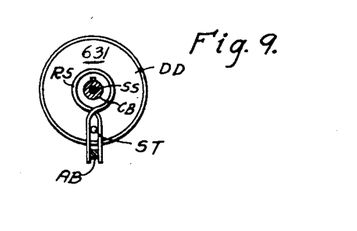
Fig. 9 shows a detail of the recording instrument according to Fig. 8.

In order to obtain in a system according to Fig. 5 a record of the regulating errors directly readable in magnitudes or percentage of positive or negative error, a recording device as exemplified by Figs. 8 and 9 may be attached to the relay circuit in parallel to (or in place of) the motor M1 of the regulator RG so that the terminals marked X, Y and Z in Fig. 8 are connected with the circuit points X, Y, Z, respectively, marked in Fig. 5. Then the motor M1' shown in Fig. 8 will operate, as to running direction and running periods, exactly as described above with reference to motor M1 in Fig. 5. The shaft of motor M1' has a worm W in engagement with a gear CG of the driving portion CP1 of an electromagnetic coupling whose energizing coil CC is series connected with the motor field windings 611 and 612 so that coil CC is energized whenever and as long as either field winding is energized. The driven coupling portion C2 has a bushing CB in slidable but non-rotary engagement with the adjacent disk DD of the recorder drum 631. A spring CS tends to hold the coupling portions CP1 and CP2 normally disengaged. Both coupling portions and the drum 631 are rotatably mounted on a stationary shaft S8 which is firmly secured to a supporting or base structure SB. A return spring RS, disposed around bushing CB, has its two ends abutting against a stud ST of disk DD (see Fig. 9), and these ends straddle also a rigid abutment AB of supporting structure SB. Spring RS permits the drum and the driven coupling portion C2 to be rotated in either direction against the spring force which tends to return the drum and coupling portion CP2 into the original angular position in which stud ST and abutment AB are in registry. A stylus 638, mounted on a holder 621, is movable along the drum. A feed screw 620, in threaded engagement with holder 621 and geared, at 691, to a motor, driving mechanism or transmission M2' serves to produce the desired translatory stylus motion. The drive is synchronized with that of the apparatus CO and PT (Fig. 5) so that the translation of stylus 638 (Fig. 8) is proportional to that of pick up 323 (Fig. 5).

The device according to Fig. 8 operates as follows. Whenever the motor M1' is energized to run in one or the other direction, coil CC is also energized and causes portion CP1 to attract and entrain portion CP2 of the electromagnetic coupling. As a result, the recorder drum 631 starts rotating in opposition to spring RS. The stylus 638 is either of the continuously writing type, such as an ink stylus, or is energized for electrolytic or spark writing whenever the electromagnetic coupling is closed. Hence, stylus 638 begins to write a peripherally extending line on the chart 633 placed on the drum. The length of this line depends on the running period of motor M1'. As soon as the motor is deenergized in the impulse-controlled manner set forth previously, the coupling is also deenergized so that the spring CS separates the coupling portions. This releases the return spring RS, and the drum turns back into its starting position. During the next operating period of motor M1' another line is written in parallel to the first one, and so forth. As a result a record of the type denoted by ER in Fig. 8 is produced. The ordinate values of the recorded diagram represents errors in plus or minus magnitudes or percentages relating to the correct or intended magnitude which is represented by the diagram zero line. The angular speed of the drum may be chosen so that the expected maximum error corresponds substantially to the available maximum angular motion of the chart surface. It will be noted that, for the purpose of clear illustration, I have shown the diagram chart not in its operative position but have turned it about the drum 90 degrees upwardly toward the observer. That is, when the apparatus is in operation the straight zero line of the record ER will appear at the stylus point whenever the drum is in its starting position.

An impulse controlled error recording apparatus of the type just described lends itself readily for testing and calibrating purposes of electrical apparatus and instruments. If, for instance, GA in Fig. 5 is a measuring instrument to be provided with an error or calibrating chart while the travelling element 321 or its drive is applied to adjust the measuring instrument or its operating circuit so that the instrument pointer travels over its indicating scale, and if the curve C is so chosen as to represent the correct or standard scale or deflection, then the chart obtained in a device according to Fig. 8 indicates directly the indicating or deflecting error of the measuring instrument GA expressed, for instance, in per cent of the scale length. The testing and calibrating method thus afforded requires considerably less time and achieves a higher accuracy than the usually manual methods heretofore available for such purposes.

Figure 10:
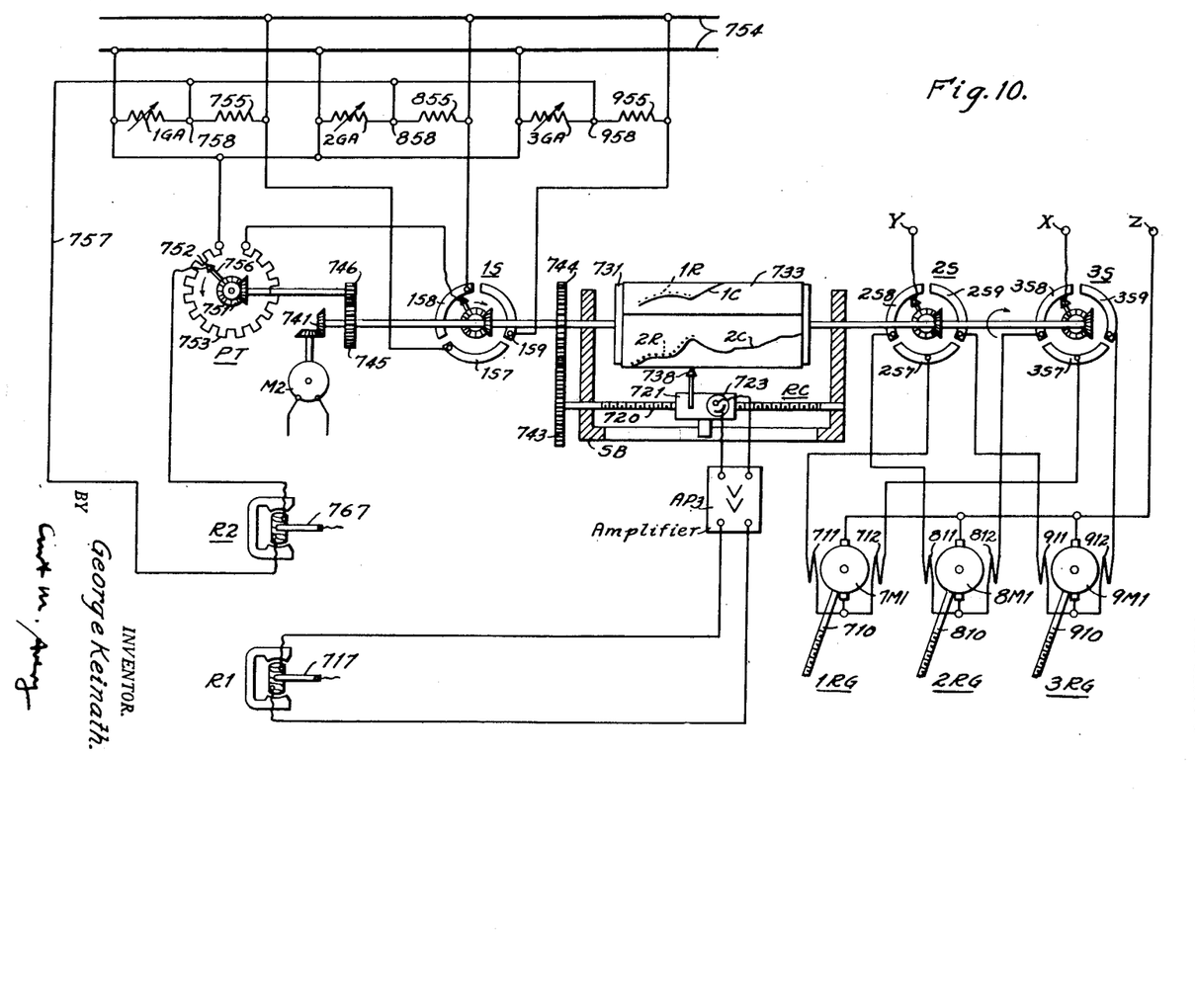
Fig. 10 is a diagrammatic showing of an embodiment of my invention designed as a multiple controller and recorder for controlling a plurality of different apparatus or conditions.

The embodiment of my invention illustrated in Fig. 10 is devised for controlling a plurality of conditions in accordance with predetermined programs which may be different for the several conditions to be controlled. The apparatus is also capable of measuring and recording the magnitude of the controlled conditions. Certain aspects of this apparatus are similar to those also disclosed in my copending application Serial No. 470,088, filed December 24, 1942, for Multiple recorder, now Patent 2,387,760.

According to Fig. 10, three regulators 1RG, 2RG and 3RG are provided for controlling the operating condition of three respective apparatus, machines or other controllable equipment. Each of these regulators has a shaft 710, 810, or 910 driven by a reversible motor 7M1, 8M1 and 9M1, respectively, which, as to purpose and function, correspond to the motors denoted by M1 in the preceding embodiments. The two field windings of each regulator motor are denoted by 711 and 712, 811 and 812, 911 and 912, respectively. The midpoints between the reversing field windings of the respective motors are attached to a common terminal point Z. The end points of the field windings of each motor are connected to contact segments of two selector switches denoted by 2S and 3S. Each of these switches has a rotatable selector contact which is attached to a terminal point Y or X. The segments 2S7, 2S8 and 2S9 of switch 2S are connected with windings 711, 811 and 911, respectively. Similarly, the segments 3S7, 3S8 and 3S9 are connected with windings 712, 812 and 912, respectively. The terminal points X, Y and Z are connected to a relay system of the type represented by Figs. 5 and 6. That is, the points X, Y and Z according to Fig. 10 are, for instance, connected to the points X, Y and Z shown in Fig. 5 so that the triple regulator arrangement of Fig. 10 takes the place of the single regulator RG and its motor M1 shown in Fig. 5.

The condition controlled by each regulator 1RG, 2RG and 3RG is measured by a gauge 1GA, 2GA and 3GA, respectively. Each gauge is connected with a reference impedance 755, 855 and 955, respectively, and forms part of a bridge type measuring network which derives its energization from a direct-current source 754 of substantially constant voltage. The three individual bridge networks are completed by a voltage balancing device PT which contains a circular resistor 753 and a slider 752 mounted on a rotatable arm 756. The slider 752 is connected with a relay R2 whose other terminal is attached through a conductor 757 to the bridge points marked 758, 858 and 958. One terminal of the resistor 753 is connected with one side of each of the three measuring networks, while the other resistor terminal is in connection with the selector contact of a switch 1S. This switch has three segments denoted by 1S7, 1S8 and 1S9 which, in turn, are individually connected with the other side of the three measuring networks, respectively.

The movable selector contacts of the three switches 1S, 2S and 3S are mounted on, or geared to, a common shaft 732 and so positioned relative to each other that segments 1S7, 2S7 and 3S7 are contacted by the appertaining movable contact at the same time and in the same phase position. Consequently, the segments 1S8, 2S8 and 3S8 or the segments 1S9, 2S9, 3S9 are also in engagement with the movable contact at the same time. As a result, the gauge 1GA is connected to the device PT during a period in which the motor 7M1 of regulator 1RG is connected to the terminal points X and Y, and the two other gauges 2GA and 3GA are in condition for a measuring operation during the periods when the respective regulator motors 8M1 and 9M1 are in connection with the terminal points X and Y.

The shaft 732 is journalled in a supporting or base structure SB and carries a recording drum 731 for accommodating a recording chart 733. The supporting structure carries also a feed screw 720 which is in threaded engagement with a carrier 721. This carrier is provided with a stylus 738 and with a program pick up member, for instance a photoelectric tube 723. Feed screw 720 is geared to shaft 732 by means of spur gears 743 and 744.

The shaft 732 is driven by a motor M2 through a gear 741 and is connected to the rotatable potentiometer arm 756 by means of gears 745, 746 and 751. The transmission ratio of gears 745 and 746 is in accordance with the number of regulators, and hence is 3:1 in the illustrated embodiment. Consequently, the slider 752 rotates three times for each full rotation of the drum 731 and of the movable contacts of selector switches 1S, 2S and 3S. As a result, a complete measuring cycle is performed with each individual gauge during the period in which the appertaining regulator is in connection with points X and Y.

The pick up 723 controls a relay R1 through an amplifier AP3.

The movable contact members 717 and 767 of relays R1 and R2 control a relay system. Since this relay system between relays R1 and R2 and points X, Y, Z may be identical with the one previously described (Figs. 5 or 6), it is not illustrated in Fig. 10.

It will be understood from the above explained principles of the invention that the multiple controller according to Fig. 10 operates in the same manner as the controllers previously described, except that three individual control functions are performed for each full rotation of the drum 731. Accordingly, the chart 733 of the exhibiting device RC is provided with three individual control diagrams, each extending over one third of the drum periphery. Each diagram has its own program curve such as those denoted by 1C and 2C. The stylus 738 may be connected to relay R2 in the manner shown in Fig. 2, so that it produces recording marks in proper correlation to the appertaining program curves. As a result, each individual diagram is provided with a curve of the measured magnitudes as the control operation proceeds. Two of these curves are shown in Fig. 10 and denoted by 1R and 2R.

As amply evidenced by the different embodiments, modifications, and adaptations to different specific uses referred to in the foregoing, the invention permits of various changes and can be carried out with the aid of various structural and electrical means without departing from its gist and essential features as set forth in the claims annexed hereto.

What I claim is:

1. Control apparatus, comprising measuring apparatus responsive to a condition to be controlled and having cyclically operable means for producing a control effect during each cycle of its operation in a phase position thereof which is indicative of the measured value of said condition, program apparatus having cyclically operable means for producing a control effect during each cycle of its operation in a phase position thereof which is indicative of the desired program value of said condition, actuating means for operating said respective means of said two apparatus in synchronism and in a given phase relation to each other, and control means for varying said condition connected to both said cyclically operating means so as to be controlled in dependence upon the phase difference between said respective control effects so as to maintain said measured value substantially in accordance with said program value.

2. Control apparatus, comprising measuring apparatus responsive to a condition to be controlled and having cyclically operable means for producing a control effect during each cycle of its operation in a phase position thereof which is indicative of the measured value of said condition, program apparatus having cyclically operable means for producing a control effect during each cycle of its operation in a phase position thereof which is indicative of the desired program value of said condition, actuating means for operating said respective means of said two apparatus in synchronism and in a given phase relation to each other, regulating means for varying said condition having a reversible motor operable independently of said actuating means, and relay means disposed between said motor and both said apparatus for controlling said motor in dependence upon the direction and magnitude of the phase difference between said two control effects so as to maintain said measured value substantially in accordance with said program value.

3. A recording controller for controlling an operating condition, comprising a member for accommodating a recording chart provided with a program curve, an assembly having a stylus member for producing a record on said chart in juxtaposition to said program curve and of a color different from that of said program curve, said assembly having also color sensitive photoelectric pick up means sensitive to said program curve and non-sensitive to said record, said chart member and said assembly being movable relative to each other in two coordinate directions of said chart, drive means for producing relative motion between said chart and said assembly in one of said directions and substantially in proportion to time, cyclically operating drive means for producing relative motion between said chart and said assembly in said other direction, measuring means for controlling the recording operation to be controlled so that said record is indicative of the condition to be controlled, and control means for varying said condition in dependence upon a difference between said program curve and said record in each cycle of said cyclical assembly motion and toward reducing said difference.

4. An electric system, comprising an exhibiting device having a surface member for exhibiting a program value for a condition under observation, an exhibiting means movable relative to said surface member and functioning to exhibit a measured value of said condition in juxtaposition to said exhibited program value, an electric pick-up means movable relative to said surface member and functioning to produce a control effect when its position has a given relation to that of the exhibited program value, measuring apparatus responsive to said condition for controlling the exhibiting operation of said exhibiting means, regulating apparatus controlled in dependence upon said control effect for varying said condition so as to maintain said measured value substantially in accordance with said program value, and a cyclically operating drive mechanism connected with at least one of said means for moving it relative to said surface member through a fixed cycle of motion at a speed independent of the rate of change of said condition so that said latter means is caused to function periodically when passing through singular phase positions during its respective cycles of motion, whereby the system operates to compare said measured value with said program value and to effect a corresponding regulation of said condition intermittently in intervals of time determined by the cyclical operation of said drive mechanism.

5. An electric system, comprising an exhibiting device having a surface member for exhibiting a program value for a condition under observation, an exhibiting means movable relative to said surface member and functioning to exhibit a measured value of said condition on said surface member in juxtaposition to said exhibited program value, an electric pick-up means movable relative to said surface member and functioning to produce a control effect when its position has a given relation to that of the exhibited program value, measuring apparatus responsive to said condition for controlling the exhibiting operation of said exhibiting means, regulating apparatus controlled in dependence upon said control effect for varying said condition so as to maintain said measured value substantially in accordance with said program value, and a periodically operating drive mechanism connected with both said means for cyclically moving them together relative to said surface member through a given range of motion and at a speed independent of the rate of change of said condition.

6. An electric system, comprising an exhibiting device having means for exhibiting on a surface a program value of a condition under observation, pick-up means movable relative to the exhibiting surface of said device for producing a control effect when the position of said pick-up has a given relation to that of the exhibited program value, control means associated with said pick-up means for varying said condition under control by said effect and in the direction required to reduce departures of said condition from said program value, measuring gauge means responsive to said condition, a measuring circuit having variable voltage control means and relay means connected to said gauge means so that said relay performs a control action when a voltage determined by said control means is indicative of the value of said condition as measured by said gauge means, an exhibiting member forming part of said exhibiting device and being movable relative to said surface for exhibiting thereon said measured value, and cyclically operating drive means for adjusting said circuit control means and moving said exhibiting member simultaneously through a given range in a given relation to each other at a rate of change independent of that of said condition, said relay means being connected to said exhibiting member for controlling the latter to represent said measured value periodically on said surface in juxtaposition to said exhibited program value.

7. An electric system, comprising an exhibiting device having means for exhibiting on a surface a program value of a condition under observation, pick-up means movable relative to the exhibiting surface of said device for producing a control effect when the position of said pick-up means has a given relation to that of the exhibited program value, control means for varying said condition, a reversible follow-up drive controlled in dependence upon said control effect and connected with said pick-up means and said control means for adjusting them simultaneously in the direction required to reduce departures of said condition from said program value, measuring gauge means responsive to said condition, a measuring circuit having variable voltage control means and relay means connected to said gauge means so that said relay performs a control action when a voltage determined by said control means is indicative of the value of said condition as measured by said gauge means, an exhibiting member forming part of said exhibiting device and being movable relative to said surface for presenting thereon said measured value and cyclically operating drive means for adjusting said circuit control means and moving said exhibiting member in synchronism with each other and at a rate of change independent of that of said condition, said relay means being connected to said exhibiting member for controlling the latter to represent said measured value periodically on said surface in juxtaposition to said exhibited program value.

8. An electric control system, comprising means for measuring the value of a condition under control, a cyclically operating device having impulse transmitting means controlled by said measuring means to issue a control impulse when the phase position of the device during its cycle of operation is indicative of the measured value of said condition, and having impulse transmitting means for issuing another control impulse when the phase position of the device during said cycle is in accordance with a pre-set reference value, control means for varying said magnitude, a constant-speed motor for adjusting said control means, and translating means for controlling said motor to be started and stopped by said impulses respectively so as to adjust said control means an amount proportional to the interval of time elapsing between said impulses.

9. System for controlling an operating condition, comprising control apparatus having a surface member for exhibiting a program value and electric pick-up means movable relative to said member, said control apparatus including drive means for periodically imparting relative motion to said pick-up means at a speed independent of variations of said condition and through a given cycle of motion so that said pick-up means are caused to produce an electric control effect at a point of said relative motion representative of said program value, measuring apparatus responsive to said condition having exhibiting means juxtaposed to said surface member so as to exhibit together therewith the departure of the measured value of said condition from said program value, regulating means for varying said condition, and electric relay means for controlling said regulating means in dependence upon said control effect during each cycle of said motion so as to reduce said departure.

10. System for controlling an operating condition, comprising control apparatus having two members movable relative to each other, one of said members having means for determining a program value and said other member having means for producing a control effect when its position during said relative motion corresponds to said program value, measuring apparatus responsive to said condition and having two members movable relative to each other and means for producing another control effect when the relative position of said latter two members is indicative of the measured value of said condition, drive means connected to said control apparatus and to said measuring apparatus for imparting simultaneous and cyclical relative motion to said two pairs of members so that said motion extends through a given range during each cycle of motion, condition control means for varying the value of said condition, and relay means connected to said control apparatus and said measuring apparatus to be controlled by said two control effects during the period of said cycle and being connected to said condition control means for controlling the latter to vary said condition in accordance with the departure of said two control effects from a given mutual time relation during said cycle period.

11. Control apparatus comprising a measuring device responsive to a condition to be controlled, a control device having a member for exhibiting a selected program magnitude and pick-up means movable independently of the variations of said condition, a drive connected to said pick-up means for moving said pick-up means repeatedly through a given cycle of motion so that said pick-up means pass periodically through a position indicative of said program magnitude, circuit means connected with said measuring device and said control device for comparing the magnitude periodically indicated by said position with the magnitude then measured by said measuring device in order to produce a control effect in dependence upon the difference between said magnitudes, and regulating means controlled by said circuit means in response to said control effect for varying said condition toward reducing such difference.

12. Control apparatus, comprising measuring means responsive to a condition to be controlled and having a cyclically movable adjusting member and first electric circuit means for providing a control impulse when the position of said movable member is indicative of the measured magnitude of said condition, a control device having a program exhibiting member and a pick-up member cyclically movable relative to each other simultaneously with and in a given relation to the motion of said adjusting member and including second electric circuit means for providing another control impulse when the relative position of said program and pick-up members is indicative of a program magnitude set by said program exhibiting member, regulating means connected to said first and second circuit means and also connected to said regulating means for varying said condition, and two impulse-responsive means for controlling said regulating means in response to said two control impulses so as to maintain the interval of time between the two impulses, occurring during simultaneous cycles of motion, substantially below a given limit value.

13. Control apparatus, comprising measuring means responsive to a condition to be controlled and having a cyclically movable adjusting member and first circuit means for providing a control effect when the position of said movable member is indicative of the measured value of said condition, a control device having means for accommodating a chart provided with a program curve and a pick-up member movable relative to the chart, drive means connected to said two members for simultaneously moving them through a periodic cycle of motion so that said members pass periodically through respective positions indicative of said measured value and the coordinate value of said program curve, second circuit means forming part of said control device for providing a second control effect at the moment when said pick-up member passes through said position indicative of said value, regulating means for varying said condition, and control means connecting said first and second circuit means with said regulating means for controlling said regulating means in response to said two control effects so as to maintain the interval of time between the two effects, occurring during simultaneous cycles of motion below a limit value.

14. An electric system, comprising two synchronized and cyclically operating impulse transmitting means for transmitting two respective electric control impulses within a recurrent cycle period, movable structure, reversible drive means disposed for imparting positioning movement to said structure and having two windings for controlling said movement in opposing directions respectively, two trigger relay means connected to said respective windings so that the one relay means first triggered during a cycle period controls the corresponding one winding to cause movement in the corresponding direction and the relay means last triggered causes said movement to cease, and circuit means connecting said two relay means to said transmitting means for triggering said relay means in response to said control impulses respectively, whereby the direction and magnitude of said movement are determined by the direction and magnitude of the phase difference of said two control impulses relative to said cycle.

15. Control apparatus, comprising measuring apparatus responsive to a condition to be controlled and having cyclically operable means for producing a control effect in a phase position, relative to the cycle, which is indicative of the measured value of said condition, program apparatus having cyclically operable means for producing a control effect during each cycle of its operation in a phase position thereof which is indicative of the desired program value of said condition, actuating means for operating said measuring and program means in synchronism with each other, a reversible motor operable independently of said actuating means, control means disposed for directionally controlling said motor and having first and second relay means, said first relay means being controlled by said measuring apparatus in response to said appertaining control effect and connected to said motor for starting it in one running direction, said second relay means being controlled by said program apparatus in response to said appertaining control effect and connected to said motor for starting it in the other running direction, said first and second relay means being arranged for mutually dependent operation so that only the one relay means first to respond during a cycle determines the running direction of said motor during said cycle.

16. Control apparatus, comprising measuring apparatus responsive to a condition to be controlled and having cyclically operable means for producing a control effect during each cycle in its operation in a phase position thereof which is indicative of the measured value of said condition, program apparatus having cyclically operable means for producing a control effect during each cycle of its operation in a phase position thereof which is indicative of the desired program value of said condition, actuating means for operating said respective means of said measuring and program apparatus in synchronism with each other, control means connected with said two apparatus and having structure movable a variable amount and controlled by said two control effects so as to be displaced an amount dependent upon the phase difference of said effects.

17. Control apparatus, comprising means for accommodating a chart provided with a curve-shaped marking of a time program of a condition to be controlled, an electric pick-up device responsive to said marking, cyclically operating drive means connected with said device for moving said device periodically across the chart through a given range of motion during each cycle period so that said device issues an impulse each time it passes over said marking, and control means connected to said device so as to be responsive to said recurrent impulses for controlling said condition in dependence of the variation of phase position of said impulses during each cycle periods.

18. Multiple control apparatus, comprising a plurality of regulating means for varying respective conditions to be controlled, a control device having program means for exhibiting a plurality of sequentially arranged program representations for controlling the variations of said respective conditions, a pick-up member forming part of said control device and being movable relative to said program means so as to issue respective impulses when passing across said program representations, impulse-responsive relay means disposed between said pick-up member and said plurality of regulating means for controlling the latter in accordance with said respective program representations, selector means for sequentially connecting said respective regulating means one at a time to said relay means, and cyclically operating drive means for producing relative motion between said program means and said pick-up member and simultaneous motion of said selector means so that said pick-up member responds repeatedly to any one of said program representations in spaced intervals of time during which the corresponding one of said regulating means is connected by said selector means to said relay means.

19. Multiple control apparatus, comprising a plurality of regulating means for varying respective conditions to be controlled, a corresponding plurality of gauges for measuring the magnitude of said respective conditions, a controlling recording device having means for accommodating a recording chart premarked with a plurality of sequentially arranged program curves, said device having pick-up means and stylus means movable relative to said chart for producing, respectively, control effects according to said curves and recording marks according to the magnitudes measured by said gauges, control relay means disposed between said control device and said regulating means for controlling the latter substantially in accordance with said program curves, cyclically operating drive means connected with said device for sequentially placing said program curves in cooperative relation to said pick-up and stylus means, and selective switch means synchronized with said drive means for sequentially connecting said respective gauges to said stylus means and said respective regulating means to said relay means.

20. An electric system, comprising a device having program means for predetermining a program value for a condition under observation and having cyclically operable impulse transmitting means for issuing a control impulse when its phase position during a cycle is indicative of said program value, means for measuring the value of said condition, cyclically operable impulse transmitting means synchronized with said first impulse transmitting means and associated with said measuring means so as to issue another control impulse when the phase position of said second transmitting means during said cycle is indicative of the measured value of said condition, adjustable control means disposed for varying said condition, and translating means having relay means connected to said two transmitting means so as to be controlled by said respective impulses, said translating means being connected to said control means for varying the adjustment of said control means in a direction dependent upon the sequence of said respective impulses and by an amount dependent upon the time interval between said respective impulses.

21. Recording apparatus, comprising measuring apparatus responsive to a condition under observation and having cyclically operable impulse means for issuing a control impulse at a cycle moment indicative of the measured value of said condition, program apparatus having cyclically operable impulse means for issuing another control impulse at a cycle moment indicative of the desired value of said condition, cyclical actuating means connected with said two impulse means for synchronously actuating them in a predetermined cycle and in a given phase relation to each other, a recording device having a surface member for accommodating a chart and a stylus member for marking the chart, said two members being movable relative to each other in two coordinate directions respectively, actuating means in driving connection with one of said members for progressively moving it in one of said directions, intermittent drive means for moving said other member in the other coordinate direction, electric circuit means connecting said drive means with said two impulse means for controlling said drive means in response to said control impulses to move said other member an amount proportional to the time between said respective cycle moments and biasing means connected with said other member for biasing it in opposition to said drive means to a given starting position so that each individual movement of said other member commences from said starting position.

22. Recording apparatus, comprising measuring apparatus responsive to a condition under observation and having cyclically operable first impulse means for issuing a control impulse at a cycle moment indicative of the measured value of said condition, program apparatus having cyclically operable second impulse means synchronous with said first impulse means for issuing another control impulse at a cycle moment indicative of the desired value of said condition, a recording device having a revolvable chart member and a stylus member movable along said chart member, actuating means in driving connection with said stylus member, biasing spring means connected with said chart member for biasing it to a given start position, intermittent drive means having a reversible motor connected with said chart member for revolving it away from said start position, and electric control means connecting said drive means with said two impulse means and being responsive to said impulses for controlling said drive means to move said chart member in a direction and by an amount depending upon sequence and phase difference of said respective cycle moments.

23. Recording apparatus, comprising a balanceable circuit for measuring the magnitude of a condition under observation having a movable balance adjusting element and having a balance-responsive relay for issuing an impulse when said element passes through the position of balance, a program apparatus having a program means indicative of a desired magnitude of said condition and having a movable pickup for issuing another impulse when passing through a position predetermined by said program means, cyclical drive means connected with said element and said pickup for moving them in synchronism with each other through a given cycle of motion, a recording device having a chart member and a stylus member movable relative to each other in two coordinate directions, actuating means for progressively moving one of said members, biasing means connected with said other member to bias it toward a given start position, intermittent drive means connected with said other member for moving said other member away from said start position, and electric control means connecting said drive means with said relay and said pickup for controlling said intermittent drive means in response to said impulses to move said other member during an operating cycle from said start position an amount dependent upon the phase difference of said respective impulses.

GEORGE KEINATH.

REFERENCES CITED

The following references are of record in the file of this patent:

UNITED STATES PATENTS

| Number | Name | Date |
|---|---|---|
| 2,045,438 | Cioffi | June 23, 1936 |
| 2,047,984 | Riggs | July 21, 1936 |
| 2,136,753 | Penn | Nov. 15, 1938 |
| 2,191,997 | Side | Feb. 27, 1940 |
| 2,262,354 | Cates | Nov. 11, 1941 |
| 2,288,064 | Belaef | June 30, 1942 |